United States Patent [19]

Crosbie

[11] Patent Number: 4,751,662
[45] Date of Patent: Jun. 14, 1988

[54] DYNAMIC FLIGHT SIMULATOR CONTROL SYSTEM

[75] Inventor: Richard J. Crosbie, Langhorne, Pa.

[73] Assignee: United States of America as represented by the Secretary of the Navy, Washington, D.C.

[21] Appl. No.: 887,418

[22] Filed: Jul. 14, 1986

[51] Int. Cl.⁴ .................................................. G09B 9/08
[52] U.S. Cl. ...................................... 364/578; 434/59; 434/55
[58] Field of Search .................. 364/578, 566; 434/34, 434/55, 59; 73/1 DC

[56] References Cited

U.S. PATENT DOCUMENTS

| | | | |
|---|---|---|---|
| 2,687,580 | 8/1954 | Dehmel | 434/55 |
| 3,063,160 | 11/1962 | Hemstreet | 434/34 |
| 3,083,473 | 4/1963 | Luton | 434/34 |
| 3,136,075 | 6/1964 | Brian | 434/34 |
| 3,196,557 | 7/1965 | Davidson et al. | 434/55 |
| 3,340,619 | 9/1967 | Bertin | 434/59 |
| 3,436,841 | 4/1969 | Whitmore et al. | 434/34 |
| 3,513,246 | 5/1970 | Frisch et al. | 364/807 |
| 3,584,429 | 6/1971 | Wadlow | 434/55 |
| 4,236,325 | 12/1980 | Hall et al. | 364/578 X |
| 4,244,120 | 1/1981 | Harris | 364/578 X |

FOREIGN PATENT DOCUMENTS 0355829 6/1980 U.S.S.R. ............................. 434/59

Primary Examiner—Parshotam S. Lall
Assistant Examiner—Thomas G. Black
Attorney, Agent, or Firm—Henry Hansen

[57] ABSTRACT

A dynamic flight simulator control system for enhancing flight realism to a pilot with regard to his perception and response to the linear forces and angular motions generated by a gimballed force and motion platform at the end of a rotating arm. Flight commands generated by controls identical to those in a specified aircraft and operated by the pilot as if flying are converted to the forces and motions predetermined for the aircraft and translated into simulator command signals which regulate the angular velocity of the arm and the roll and pitch of the platform. The perceived angular motions for both the aircraft pilot and the simulator pilot are predicted by computers pre-programmed with mathematical models of their human angular sensor responses and any difference is minimized by iteratively adjusting coefficients in the simulator command signals for predetermined weighting factors based on the individual pilot's preference.

8 Claims, 5 Drawing Sheets

DYNAMIC FLIGHT SIMULATOR CONTROL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to dynamic flight simulators used for familiarizing pilots with the force and motion environment associated with actual flight of modern high performance aircraft; and more particularly to a control system for the simulator's force and motion platform for enhancing flight realism to the occupant with regard to his perception and response to the linear and angular motions generated by the platform.

A ground-based dynamic flight simulator provides a safe and convenient research facility for test and evaluation of new concepts in crew station design, cockpit displays and controls, restraint systems, aerodynamic configurations and handling qualities as well as conducting training in pilot procedures in the accleration or G-environment in which they are designed to be utilized.

A human centrifuge such as disclosed in U.S. Pat. No. 3,732,630 to Richard J. Crosbie et al provides one type of motion base for these purposes. A ten-foot diameter spherical gondola is mounted in a two-gimbal drive system at the end of a rotating arm, and an aircraft cockpit complete with an out-the-window visual display system, instrumentation, and flight controls similar to those in a given aircraft, is housed within the gondola. The angular motion of the arm and the two angular rotations of the gondola within the gimbals provide three controllable degrees of freedom which are normally used to approximate the total G-force imparted on a pilot by the six degrees of freedom of the aircraft in actual flight. With only three degrees of freedom, however, it becomes physically impossible to match precisely both the linear forces and angular motions of the gondola with those of the aircraft. Of course it is contemplated that other types of motion bases may be used with commensurate limitations in their ability to match the total dynamic environment of the aircraft.

The mismatch is not critical in open loop physiological studies where a wide variety of complex multi-directional G-force profiles on a subject are generated from a remote preprogrammed control system. However, when the centrifuge is used as a force and motion base with the pilot placed in a closed control loop the mismatch is not acceptable, especially when he is required to "fly" through maneuvers involving periods of transient G-forces. Rapid rotations of the two gimbals and the centrifuge arm required to simulate precisely the G-force environment of such maneuvers result in angular motions which are totally unrelated to those in the actual aircraft. This deception produces a conflict in the pilot's sensory response making the simulator difficult to "fly" and severely limiting for pilot-controlled flight simulation studies.

Total simulation is particularly difficult in the flight regime slightly above +1G because of the large gimbal motions required, and is virtually impossible between −1G and +1G due to the ever present acceleration of gravity. Consequently, simulation requirements were relaxed for rapidly changing G-forces in the region slightly above and below +1G, but still enabling the simulator to generate forces having similar debilitating and disorienting effect on the pilot as those produced by the actual aircraft.

SUMMARY OF THE INVENTION

Accordingly, it is an object of the present invention to provide a dynamic flight simulator which reproduces the total G-force environment associated with flight of modern high-performance aircraft in response to inputs controlled by the pilot in the simulator, and which creates a linear force and angular motion environment perceived by the simulator pilot as representative of the aircraft. Another object is to provide a control system which effectively matches the angular motions perceived by the simulator pilot with those perceived by the aircraft pilot, by regulating the roll and pitch gimbal drive signals to create rotating linear acceleration vectors in a timely fashion with respect to the pure angular rotations. Still another object is to provide a control system which provides smooth and continuous control of the simulator in the region of +1G and below, which minimizes the disturbing angular artifacts experienced by simulator pilots during periods of varying accelerations but produces the desired stress effect on the pilot's physiological system. A further object is to effect a match between the angular motions perceived through the simulator pilot's visual receptors and those perceived through his proprioceptors. A still further object is to provide a system for continuously predicting the angular motion perceived by a pilot during flight maneuvers generated in an aircraft or in a dynamic flight simulator.

Briefly, these and other objects of the invention are accomplished by comparing the perceived angular motions predicted for the simulator pilot with those predicted for the actual aircraft pilot in flight and adjusting coefficients and weighting factors until the perceived difference is minimized. Controls identical to those in a specified aircraft, operated by the simulator pilot as if flying, are converted to the linear forces and angular motions predetermined for the aircraft and translated into simulator command signals for regulating the angular velocity of the rotating arm and the roll and pitch of the gimbals. The perceived angular motions for both the aircraft pilot and the simulator pilot are predicted by computers pre-programmed with mathematical models of their human angular sensor responses and any differences is minimized by iteratively adjusting the coefficients in the simulator command signals for a predetermined weighting factors based on the individual pilot's preference.

For a better understanding of these and other objects and aspects of the invention, reference may be made to the following detailed description taken in conjunction with the accompanying drawings wherein:

DESCRIPTION OF THE PREFERRED EMBODIMENT

Figure 1:
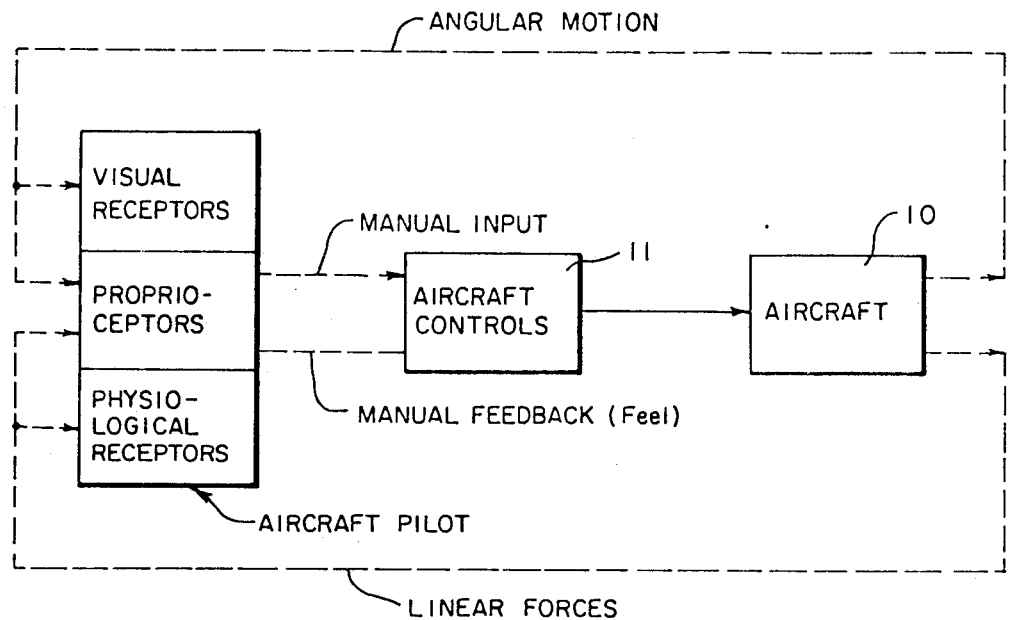
FIG. 1 is diagrammatic representation of angular motions and linear forces stimuli and their receptors in a closed-loop human sensing system for an aircraft pilot.

Referring now to the drawings wherein like characters designate like or corresponding parts throughout the several views, there is shown in FIG. 1 a closed-loop human sensing system for an aircraft pilot controlling an aircraft 10 in flight through manually operated controls 11. In addition to feedback through the feel of the control stick and foot pedals, the pilot senses the angular motion and linear force stimuli through visual, proprioceptive and physiological receptors. The visual receptors sense the angular motion, including position, rate and acceleration of the aircraft, as seen by the pilot through the aircraft canopy and the instrument displays within the cockpit. The physiological receptors sense the linear acceleration forces imparted to various parts of the pilot's body. The proprioceptive receptors sense the angular motion of the pilot as perceived through his tactile/kinesethic and vestibular receptors. Angular motion stimulation for these proprioceptive receptors can be separated into two components: angular accelerations and rotating linear acceleration vectors. Thus the visual receptors receive their stimuli from the angular motion of the aircraft, the physiological receptors from the linear forces on the aircraft, and the proprioceptors from both the angular motion and linear acceleration vectors. Measurements made of human perceptual responses to separate and combined oscillatory stimuli of angular acceleration and rotating linear acceleration vectors about the roll and pitch axes reveal that, when the mean phase angle shifts of the perceived responses for each component stimulus are taken into account, the perceived response to the combined stimuli can be predicted from the scaled sum of the responses.

Figures 2A, 2B, 2C:
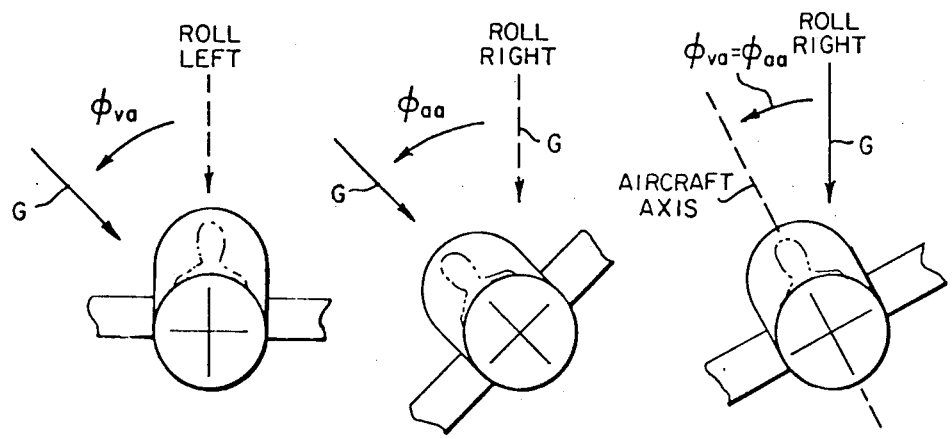
FIGS. 2A, 2B and 2C are diagrammatic representations of angular and vector rotations perceived by an aircraft pilot about his roll axis.

FIGS. 2A, 2B and 2C illustrate three different ways the angular acceleration and rotating linear acceleration vectors combine to create the pilot's perception of angular rotation $\phi_a$ about the aircraft roll axis. In pure vector rotation $\phi_{va}$, (FIG. 2A), where the pilot is stationary while the vector rotates, the vestibular otolith organs along with tactile/kinesthetic receptors are stimulated by the rotating linear acceleration vector G. In pure angular rotation $\phi_{aa}$, (FIG. 2B), where the vector and pilot both rotate through the same angle, the vestibular semicircular canals are stimulated by the angular accelerations. In combined angular and vector rotations $\phi_{va} + \phi_{aa}$ (FIG. 2C), where the vector is stationary while the pilot rotates, the otolith and semicircular canals are both stimulated together with the tactile/kinesthetic receptors. Consequently, by controlling the roll and pitch gimbal drive signals to create rotating linear acceleration vectors in a timely fashion with respect to pure angular rotations, the desired angular perception can be achieved.

Figure 3:
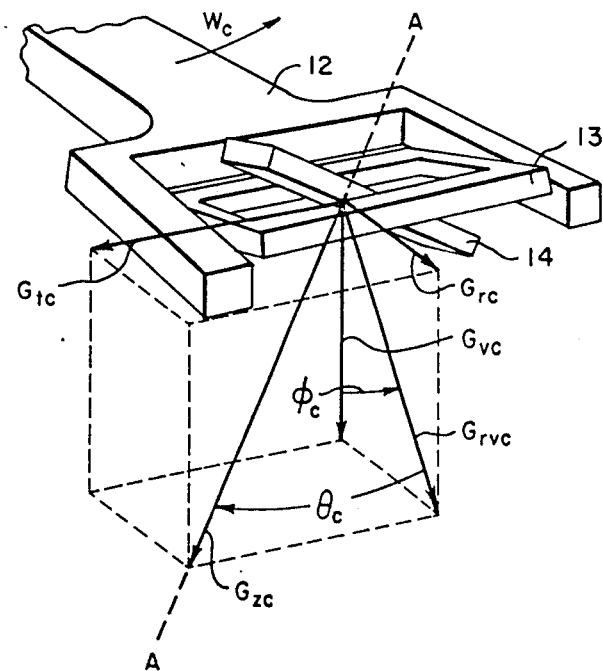
FIG. 3 is a vector diagram representing various angular motions and acceleration forces as applied to a dynamic flight simulator according to the invention.

Referring now to FIG. 3, an aircraft cockpit, not shown, is mounted in a two-gimbal system at the end of an arm 12 of radius R (i.e. 50 feet), rotating at an angular velocity $\omega_c$. The gimbal system includes an outer gimbal 13 rotating through an angle $\phi_c$ about a horizontal axis perpendicular to the arm 12, and an inner gimbal 14 rotating through an angle $\theta_c$ about an axis in the plane of the outer gimbal 13 and perpendicular to its axis. These angles along with the angular velocity $\omega_c$ of the arm 12 constitute the three independent, controllable functions used in programming and controlling of the simulator, and manifest the orthogonal components $G_{rc}$, $G_{tc}$ and $G_{vc}$ for radial tangential and vertical accelerations, respectively. They are related to the transverse, lateral and longitudinal acceleration force components $G_{xc}$, $G_{yc}$ and $G_{zc}$, and the roll, pitch, and yaw angular velocities $p_c$, $q_c$ and $r_c$ experienced by the simulator pilot through the following equations:

$$G_{xc} = G_{tc} \cos \theta_c + G_{rc} \sin \phi_c \sin \theta_c - G_{vc} \cos \phi_c \sin \theta_c \quad \quad 1.$$

$$G_{yc} = G_{rc} \cos \phi_c + G_{vc} \sin \theta_c \quad \quad 2.$$

$$G_{zc} = G_{tc} \sin \theta_c - G_{rc} \sin \phi_c \cos \theta_c + G_{vc} \cos \phi_c \cos \theta_c \quad \quad 3.$$

$$p_c = \dot{\phi}_c \cos \theta_c - \omega_c \cos \phi_c \sin \theta_c \quad \quad 4.$$

$$q_r = \dot{\theta}_c + \omega_c \sin \phi_c \quad \quad 5.$$

$$r_c = \dot{\phi}_c \sin \theta_c + \omega_c \cos \phi_c \cos \theta_c \quad \quad 6.$$

Figure 4:
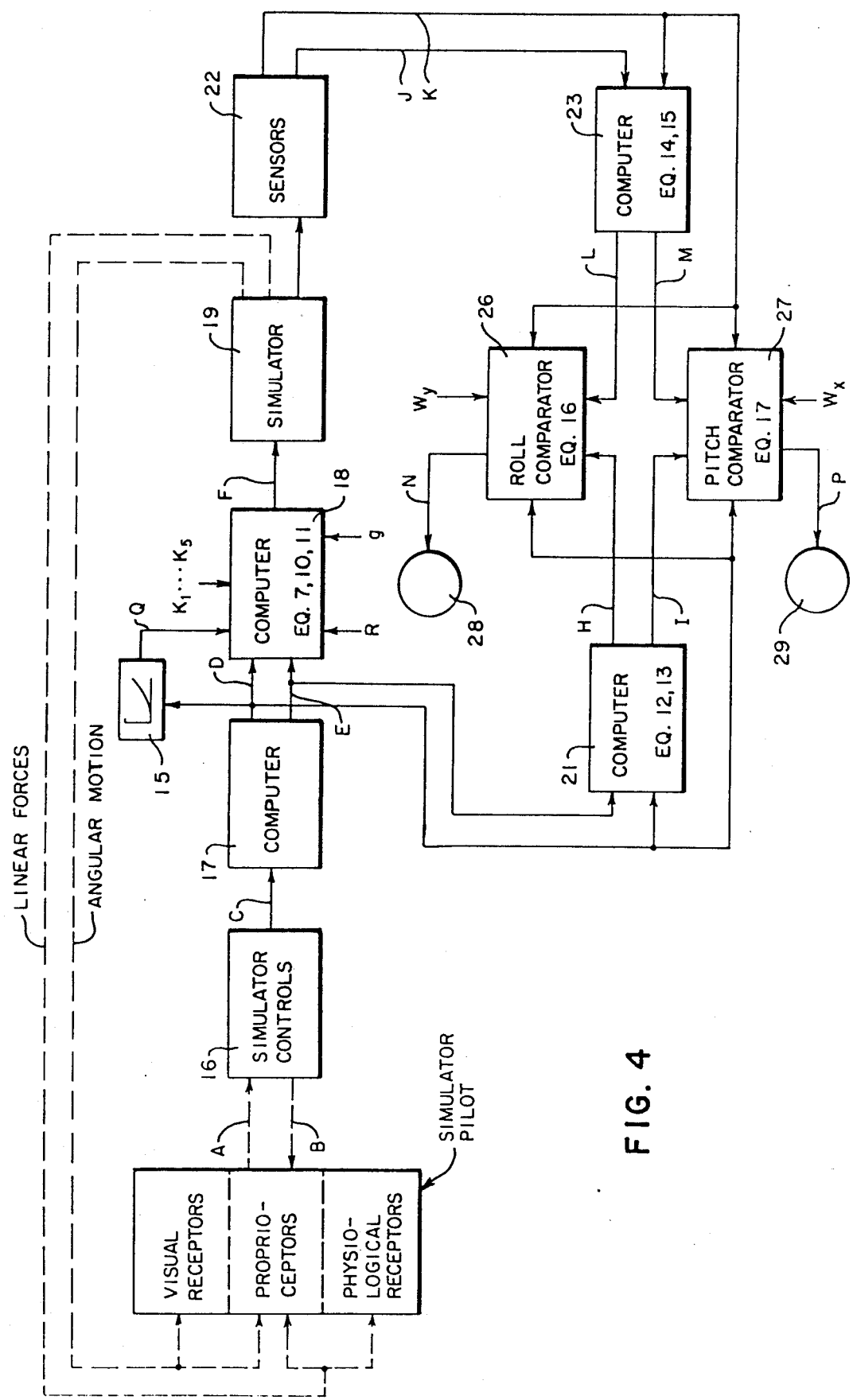
FIG. 4 is a block diagram of a simulator control system according to the invention.

Referring now to FIG. 4, a simulator pilot, seated in an aircraft cockpit mounted in the gimbaled gondola, manually operates through input A simulator controls 16 which physically correspond to those in the actual aircraft and which generate flight command signals C such as aileron, elevator, rudder, thrust and trim adjustments. The feedback signal B corresponds to the feel of the control actuators imparted to the pilot. For the particular aircraft being simulated in flight, command signals C are translated by well-known equations of motion for a specific aircraft programmed in an on-line computer 17 to generate linear force signals D corresponding to the transverse, lateral and longitudinal acceleration components $G_{xa}$, $G_{ya}$ and $G_{za}$, and angular motion signals E corresponding to the roll, pitch, and yaw angular velocities $p_a$, $q_a$ and $r_a$. The yaw rate $r_a$ is not relevent to this embodiment. Assuming the simulator is producing precise g-force control, then the aircraft's transverse, lateral and longitudinal acceleration forces $G_{xa}$, $G_{ya}$ and $G_{za}$ can be substituted for $G_{xc}$, $G_{yc}$ and $G_{zc}$ in Equations 1, 2 and 3. Then solving for the simulator command signals $\omega_c$, $\phi_c$, and $\theta_c$ the following equations result:

$$\omega_w = \int \left( \pm \frac{g}{r} \sqrt{|G_a^2 - 1 - G_{rc}^2|} \right) dt \quad \quad (7)$$

where $G_a = \sqrt{G_{xa}^2 + G_{ya}^2 + G_{za}^2}$ $$\phi_c = \sin^{-1} \frac{G_{ya}}{G_{rvc}} - (\tan^{-1} G_{rc}) \quad \quad (8)$$

where $G_{rvc} = \sqrt{G_{rc}^2 + G_{vc}^2}$ $$\theta_c = \sin^{-1} \frac{G_{xa}}{G_{xza}} + \left( \sin^{-1} \frac{G_{tc}}{G_{xza}} \right) \quad \quad (9)$$

-continued $$\text{where } G_{xza} = \sqrt{G_{xa}^2 + G_{za}^2}$$

These are the basic force equations required to provide precise G-force control of the simulator. The first term in each of Equations 8 and 9 produces the lateral and transverse acceleration components $G_{yc}$ and $G_{xc}$ on the pilot, respectively. The second term in each equation is purely simulator-related and is considered to be the prime contributor to the angular artifacts perceived by the simulator pilot. In order to reduce these angular artifacts the second terms in Equations 8 and 9 are modified by the transfer functions $1/k_1S+1$ and $1/k_4S+1$, respectively, as disclosed in an article by Crosbie, R. J. and Kieffer, D. A. entitled "Controlling the Human Centrifuge as Force and Motion Platform for the Dynamic Flight Simulator Technologies", Proceedings of AIAA Flight Simulation Conference, St. Louis, MO, July 22–24, 1985. Finally, in order to introduce aircraft motion cueing to the simulator pilot, the gimbal control signals are further altered to include third terms $k_2p_a$ and $k_5q_a$ in Equation 8 and 9, respectively. The values for $k_1 \ldots k_5$ are determined in a manner described hereinbelow. Thus, the equations for gimbal control, are as follows:

$$\phi_c = \sin^{-1}\frac{G_{ya}}{G_{rwc}} - (\tan^{-1} G_{rc})\left(\frac{1}{k_1S + 1}\right) + k_2p_a \quad (10)$$

where $k_1, k_2$ = roll coefficients $$\theta_c = \sin^{-1}\frac{G_{xa}}{G_{xza}} + \left(\sin^{-1}\frac{G_{tc}}{G_{xza}}\right)\left(\frac{k_3}{k_4S + 1}\right) - k_5q_a \quad (11)$$

where $k_3, k_4, k_5$ = pitch coefficients

It is also recognized that Equations 7, 8 and 9 provide no solution for the region between $\pm 1G$ and develop large gimbal motion commands in the region slightly above $+1G$, thus precluding pilot-controlled operation during increasing or decreasing G manuevers from straight and level flight. It is therefore necessary to further modify or perturb the basic force equations, and consequently the drive signals to the arm and gimbals, in order to control the simulator in regions above and below the $+1G$ level and to minimize the angular artifacts.

Operating the simulator at a bias G-level provides a solution; however, the exact amount of the bias and the slope of the G-curve above and below the bias level is determined to insure:

(a) pilot acceptable $G_{zc}$ levels with regard to fatigue for continuous operation (typically one hour);

(b) minimal gimbal motions during G increases or decreases from the bias level;

(c) continuous control of the simulator to $-1G_{za}$ with some G unloading effects, and with no disturbing discontinuities;

(d) continuous turning of the simulator during operation; and (e) primary effect of $G_{za}$ on simulator pilot's physiological system with minimal changes in $G_{xa}$ and $G_{ya}$.

Figure 5:
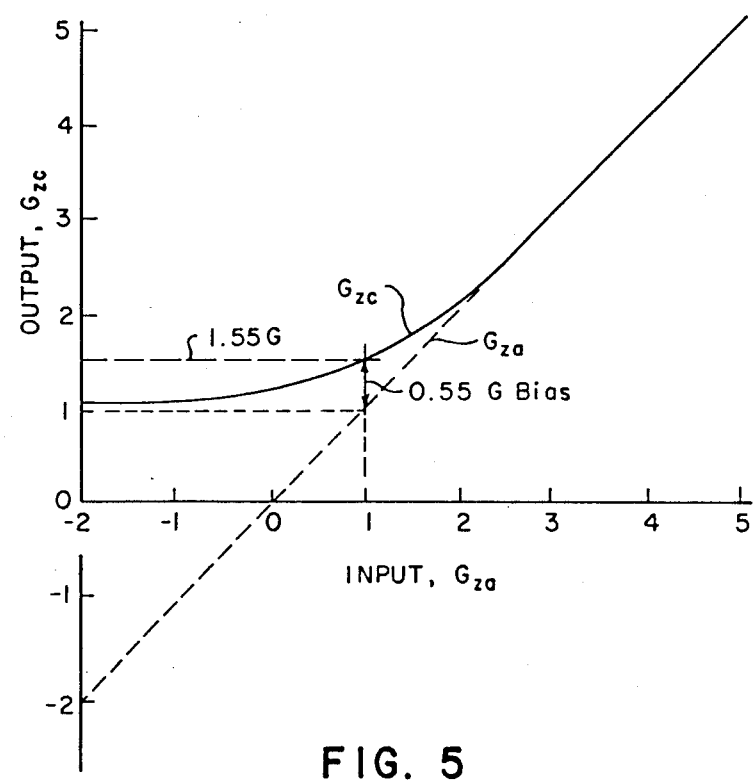
FIG. 5 is a graph of simulator forces as a function of the aircraft forces.

The graph in FIG. 5 illustrates how $G_{za}$ is modified when driving the simulator to satisfy these criteria. Therefore, in Equation 7, 10 and 11, where simulator command signals are derived which achieve a match between the component linear accelerations in the aircraft with those in the simulator, $G_{za}$ is modified by the output signal Q of a function generator 15 according to the graph. When $G_{za}$ is at 1.0G (for example during straight and level flight) the simulator operates at a $G_{zc}$ of 1.55G, or with a bias of 0.55G. When $G_{za}$ is at 2.5G and above (for example during pull-up) the simulator $G_{zc}$ matches that of the aircraft. It can also be seen that the simulator $G_{zc}$ will never go below approximately 1.05G.

An on-line computer 18 in FIG. 4, programmed with Equations 7, 10 and 11, receives signals D, E and Q, and signals indicative of the arm radius R and gravity g, to produce control signal F, including arm rotation $\omega_c$, pitch $\theta_c$ and roll $\phi_c$, which connect and drive a simulator 19. The angular motion and linear forces imparted to a pilot within the simulator 19 stimulate his visual, proprioceptive and physiological receptors to which he responds at signal A, thus forming a closed loop control system.

Control signals D and E also connect to the input of an on-line computer 21 programmed to generate signals H and I indicative of the perceived roll $\phi'_a$ and pitch $\theta'_a$ angular motions predicted for the pilot in actual flight of the specific aircraft. The equations for these predicted angular motions, experimentally derived on a human centrifuge and reported in an article by Crosbie, R. J. entitled "Application of Experimentally Derived Pilot Perceptual Angular Response Transfer Functions", Proceedings of the AIAA Flight Simulators Technologies Conference and Technical Display, AIAA-83-1100-CP, June 13–15, 1983: Niagara Falls, N.Y., are as follows:

$$\phi'_a = \phi'_{aa} + \phi'_{va} \quad (12)$$
$$= \frac{p_a}{G_{zcd} + 1} \cdot \frac{12.48}{(S + 10)(S + 5)} +$$
$$\frac{G_{zcd}\phi_{va}}{G_{zcd} + 1} \cdot \frac{6.66(S + .75)}{(S + 10)(S + .5)}$$

where $G_{zcd} = 1$ when $G_{za} < 1$, or $$= G_{za}\left(\frac{1}{1 + S}\right) \text{ when } G_{za} \geq 1$$

$$\phi_{va} = \tan^{-1}\frac{G_{ya}}{G_{zcd}}$$

$$\theta'_a = \theta'_{aa} + \theta'_{va} \quad (13)$$
$$= \frac{q_a}{G_{zcd} + 1} \cdot \frac{12.48}{(S + 10)(S + 2.5)} +$$
$$\frac{G_{zcd}\theta_{va}}{G_{zcd} + 1} \cdot \frac{2.66(S + .75)}{(S + 10)(S + .2)}$$

where $\theta_{va} = \tan^{-1}\frac{G_{xa}}{G_{zcd}}$

The first terms $\phi'_{aa}$ and $\theta'_{aa}$ in Equations (12) and (13) represent the pilot's perceived angular displacement of the simulated aircraft due to pure roll and pitch, respectively; the second terms $\phi'_{va}$ and $\theta'_{va}$ represent the pilot's perceived angular displacement of the acceleration vector in the simulated aircraft about the roll and pitch axes, respectively.

Sensors 22 attached to the simulator 19 sense the actual transverse, lateral and longitudinal accelerations $G_{xc}$, $G_{yc}$, and $G_{zc}$ and the roll and pitch angular velocities $p_c$ and $q_c$. Sensor output signals J and K corresponding to these parameters are applied to the input of an on-line computer 23, programmed like computer 21, to generate signals L and M indicative of the perceived angular motions of roll $\phi'_c$ and pitch $\theta'_c$ predicted for the simulator pilot for the same flight command signals C. The equations for signals L and M, derived like Equations 12 and 13, are as follows:

$$\phi'_c = \phi'_{ac} + \phi'_{vc} \quad (14)$$

$$= \frac{\phi_c}{G_{zcd} + 1} \cdot \frac{12.48S}{(S + 10)(S + 5)} +$$

$$\frac{G_{zcd}\phi_{vc}}{G_{zcd} + 1} \cdot \frac{6.66(S + .75)}{(S + 10)(S + .5)}$$

$$\theta'_c = \theta'_{ac} + \theta'_{vc} \quad (15)$$

$$= \frac{\theta_c}{G_{zcd} + 1} \cdot \frac{12.48S}{(S + 10)(S + 2.5)} +$$

$$\frac{G_{zcd}\theta_{vc}}{G_{zcd} + 1} \cdot \frac{2.66(S + .75)}{(S + 10)(S + .2)}$$

The first terms $\phi'_{ac}$ and $\theta'_{ac}$ in Equations (14) and (15) represent the subject's perceived angular displacement of the simulator due to pure roll and pitch, respectively; the second terms $\phi'_{vc}$ and $\theta'_{vc}$ represent the subject's perceived angular displacement of the acceleration vector in the simulator about the roll and pitch axes, respectively.

The aircraft and simulator perceived roll angles $\phi'_a$ and $\phi'_c$ in signals H and L are compared and the absolute value of their differences, integrated over a period of time T, are added to a weighting function in a roll comparator 26 to produce signal N at an indicator 28. Also the perceived aircraft and simulator pitch angles $\theta'_a$ and $\theta'_c$ in signals I and M are compared and the absolute value of their differences, integrated over the time T, are added to a weighting function in a pitch comparator 27 to produce signal P at an indicator 29. The computations are mathematically expressed in accordance with the following equations:

$$\Sigma\phi' = |\Delta\phi'| + W_y |\Delta G_y| \quad (16)$$

$$= \frac{1}{T} \int_0^T |\phi'_a - \phi'_c| dt +$$

$$W_y \left[ \frac{1}{T} \int_0^T |G_{ya} - G_{yc}| dt \right]$$

$$\Sigma\theta' = |\Delta\theta'| + W_x |\Delta G_x| \quad (17)$$

$$= \frac{1}{T} \int_0^T |\theta'_a - \theta'_c| dt +$$

$$W_x \left[ \frac{1}{T} \int_0^T |G_{xa} - G_{xc}| dt \right]$$

The second term in each Equation 16 and 17, which is the weighting function, determines the relative influence of angular motion and linear acceleration to the pilot's perception. Therefore, weighting factors $W_y$ and $W_x$ are varied according to the individual pilot's preference to either of these influences. These factors are usually small and are often neglected.

The values selected for $k_1 \ldots k_5$ in Equation 10 and 11 optimize the control system for realism of the simulator pilot's perception of his angular motions. This is accomplished using a series of prerecorded simulated flight maneuvers $M_1, M_2 \ldots M_n$ to control the simulator without a pilot. The accelerations and angular motions $G_{xa}, G_{ya}, G_{za}, p_a$ and $q_a$ computed during these maneuvers drive the unmanned simulator during each of the runs described below. Adjustments to the roll and pitch coefficients $k_1, k_2, k_3, k_4$ and $k_5$ in Equations 10 and 11 are made in the following sequence of steps:

(a) Determine $k_1$ for maneuver $M_1$ by setting $k_2$, $G_{ya}$ and $W_y$ to zero in Equations 10 and 16, and adjusting $k_1$ over a repeated series of maneuvers $M_1$ until the perceived integrated roll $\Sigma\phi'$ is minimized. Repeat this step for maneuvers $M_2, M_3 \ldots M_n$.

(b) Determine $k_2$ for maneuver $M_1$ by leaving $k_1$ as determined in step (a) with $W_y$ at zero, but with $G_{ya}$ now included, and by adjusting $k_2$ until the perceived integrated roll $\Sigma\phi'$ is minimized. Repeat this step for maneuvers $M_2, M_3 \ldots M_n$.

(c) Determine $k_1$ and $k_2$ for various weighting factors $W_y$ greater than zero by repeating steps (a) and (b) and plotting the relationship of $k_1$ and $k_2$ vs. $W_y$. These values of $k_1$ and $k_2$ are reserved for use according to the pilot preferences noted above.

(d) Determine $k_3$ and $k_4$ for maneuver $M_1$ by setting $k_5$, $G_{xa}$, and $W_x$ to zero in Equations 11 and 17, and by adjusting $k_3$ and $k_4$ until the perceived integrated pitch $\Sigma\phi'$ is minimized. Repeat this step for maneuvers $M_2$, $M_3 \ldots M_n$.

(e) Determine $k_5$ for maneuver $M_1$ by leaving $k_3$ and $k_4$ as determined in step (d) with $W_x$ at zero, but with $G_{xa}$ now included, and by adjusting $k_5$ until the perceived integrated pitch $\Sigma\phi'$ is minimized. Repeat this step for maneuvers $M_2, M_3 \ldots M_n$.

(f) Determine $k_3$, $k_4$ and $k_5$ for various weighting factors $W_x$ greater than zero by repeating steps (d) and (e) and plotting the relationship of $k_3$ and $k_4$ and $k_5$ vs. $W_x$. Like $k_1$ and $k_2$, these values are reserved for use according to the pilot prefernces noted above.

While actual simulator response data were used in the foregoing procedures, it is contemplated that a mathematical model of the simulator, including the equations of motion, Equations (1) through (6) supra, and the response characteristics as predicted or measured, may be used instead for an unavailable or nonexistant simulator. This approach saves considerable cost and time of operating the simulator for determining the coefficients $k_1 \ldots k_5$, and provides a basis for determining the design and response characteristics of specifications for future simulators.

With the values of $k_1 \ldots k_5$ determined as above, "fine tuning" can be accomplished with a pilot-occupied simulator and the full system in operation, including the visual out-the-window and instrument displays. The system is first operated in an open-loop mode with the pilot out of the control loop using prerecorded maneuver $M_1$ with $W_x$ and $W_y$ at zero, and the previously determined values for $k_1 \ldots k_5$. The simulator pilot's comments are noted. This is repeated for other prerecorded maneuvers $M_2 \ldots M_n$ and pilot comments. Based on a consistency of the comments, minor adjustments are made in $k_1 \ldots k_5$. For example, if the pitch angular motion $\theta'_c$ is perceived as too strong during pitching maneuvers, $k_5$ may be reduced; or if the pitch angular motion $\theta'_c$ is too strong during increasing G, $k_3$ may be reduced or $k_4$ increased. This procedure is then repeated for values of $W_x$ and $W_y$ greater than zero and the optimum values thereof selected based upon the simulator pilot's comments.

Finally the system is run in a closed-loop mode with the pilot in the control loop and the full system in operation, including the visual out-the-window and instrument displays. Based on the consistency of his comments from this run, the final values of the coefficients $k_1 \ldots k_5$ are determined. While these values are generally universal for a given simulator, individual preferences may necessitate still further adjustment.

Figure 6A:
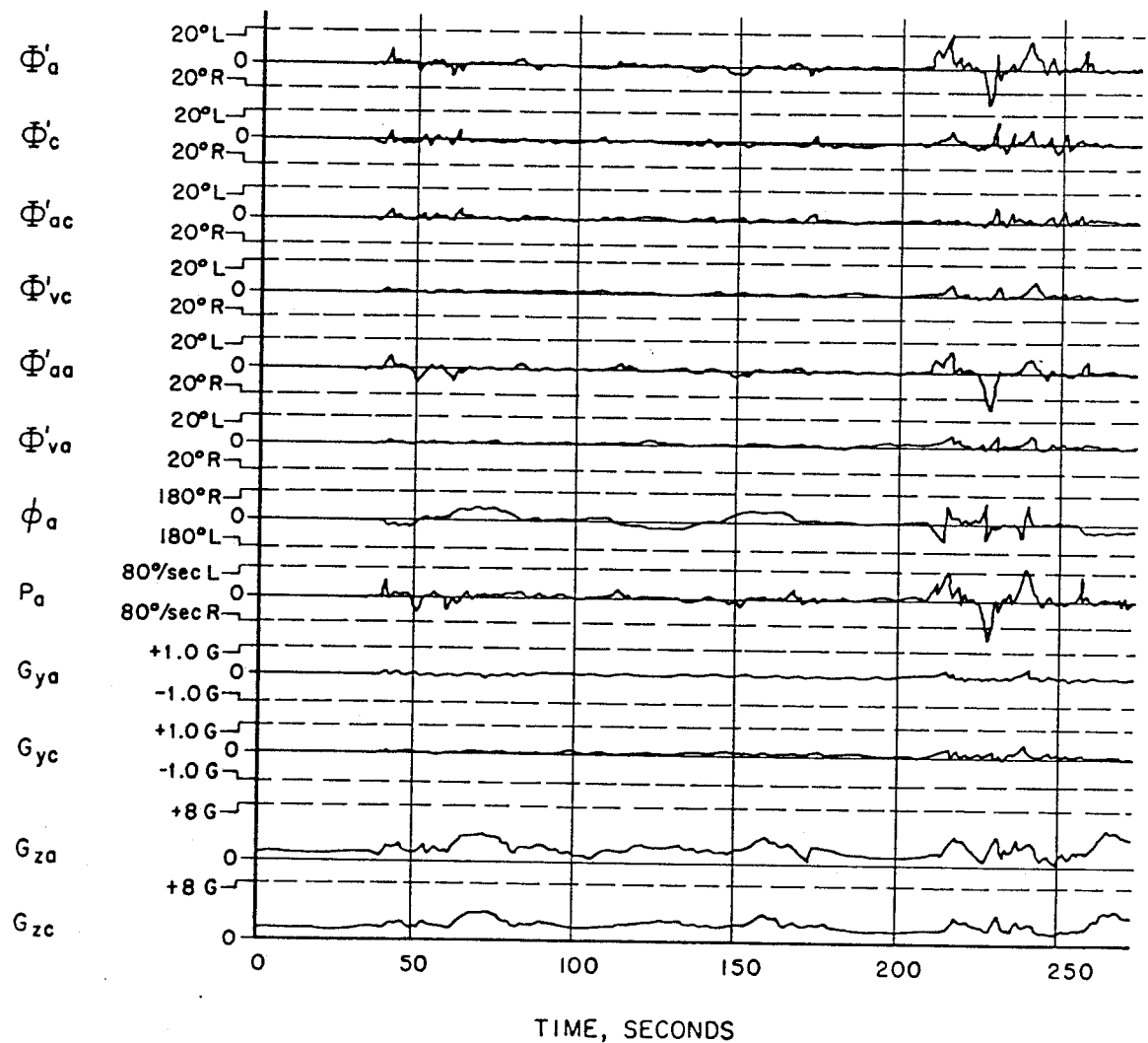
FIGS. 6A and 6B are typical flight data recordings taken during operation of the simulator control system.
Figure 6B:
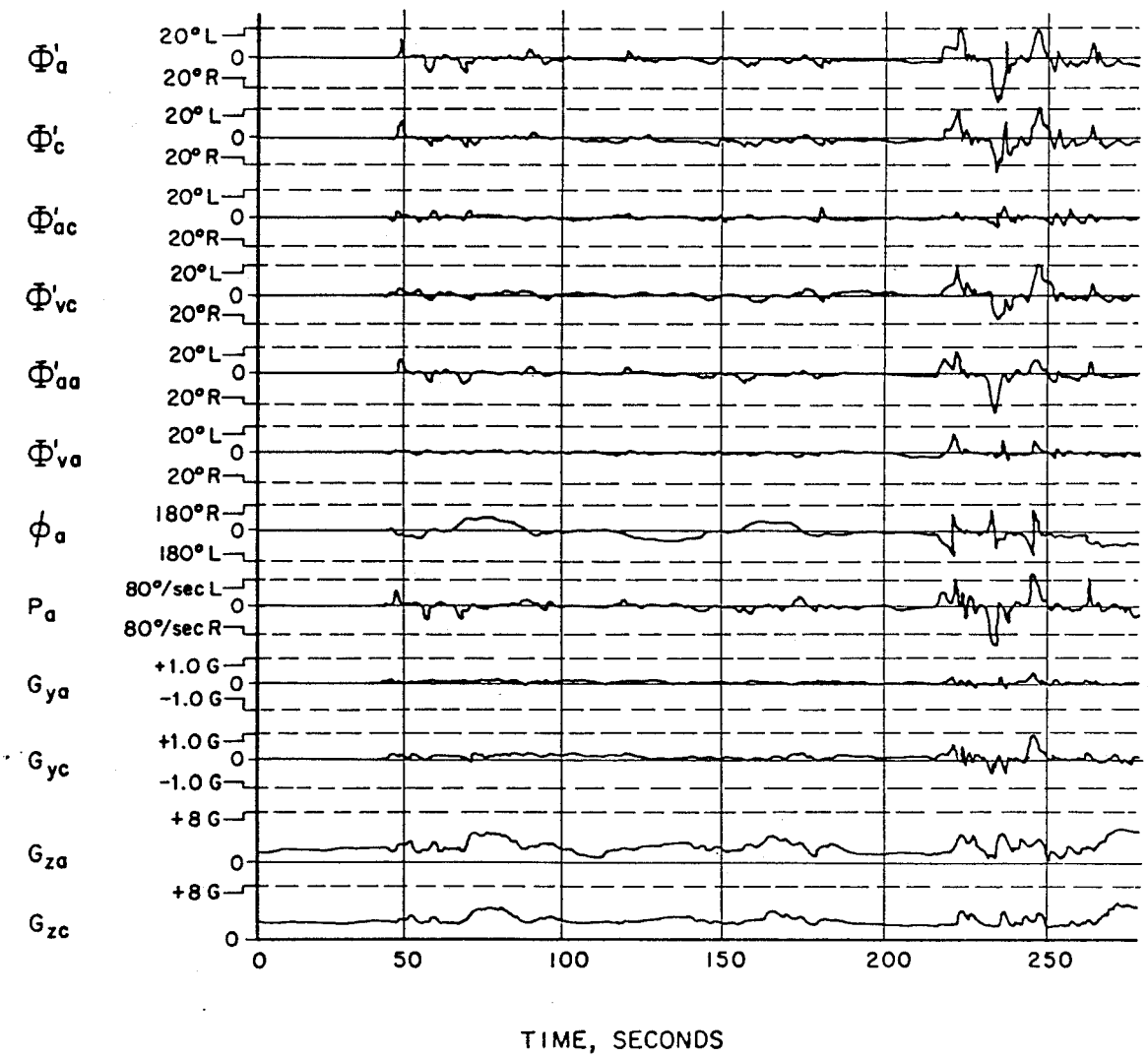

The effectiveness of the control system of the present invention is graphically illustrated in FIGS. 6A and 6B which provide comparisions between the linear accelerations and angular responses for the pilot in the simulated aircraft and in the simulator during a series of identical roll-left and roll-right maneuvers $\phi_a$, including complete roll-overs.

The comparison in FIG. 6A resulted from using the precise G-force control Equations 7, 8 and 9. The simulator lateral and longitudinal accelerations $G_{yc}$ and $G_{zc}$ can be seen to match quite well with the corresponding aircraft accelerations $G_{ya}$ and $G_{za}$, as do the perceived acceleration vector rotations $\phi'_{vc}$ and $\phi'_{va}$ predicted for the simulator pilot and the aircraft pilot, respectively. However, the perceived angular rotations $\phi'_{ac}$ predicted for the aircraft pilot resulted in a mismatch between the resultant roll angular motions $\phi'_c$ and $\phi'_a$ predicted for the two pilots and, by inference, between the angular motions cues received by the simulator pilot's visual and proprioceptive receptors. This data is consistent with the angular artifacts produced during precise G-force control of the simulator.

The comparison in FIG. 6B results from using the Equations 7, 10, 11, 16 and 17. The match is readily apparent in the phasing and amplitude of the simulator pilot's perceived angular rotations in roll $\phi'_c$ and longitudinal accelerations $G_{zc}$ compared to the aircraft pilot's perceived angular rotations in roll $\phi'_a$ and longitudinal accelerations $G_{za}$ during both roll-left and roll-right maneuvers, and including the complete roll over maneuvers.

Some of the many advantages and novel features of the invention should now be readily apparent. For example, the employment of human sensor response models enables the design and evaluation of existing or planned simulator force/motion platforms and their control algorithms. For existing systems, the models make it possible for systematic tuning of control parameters to achieve a maximum degree of angular motion realism by the simulator pilot prior to enduring manned testing. The differences between the angular motions perceived by the simulator pilot and the aircraft pilot are minimized. For new systems, the models enable evaluation of the degree of angular motion realism projected for a given design or for modifications to that design and the determination of performance specifications for each control parameter. It is also apparent that apparatus is disclosed for developing, refining and evaluating control algorithms for force/motion platforms of modern flight simulators with particular reference toward the control system design of a human centrifuge as a force/motion platform for the total G-force environment for a dynamic flight simulator. The resulting control algorithms are designed to reinforce the realism of the simulator pilot's perception of his simulated aircraft's angular motions.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A control system for a dynamic flight simulator comprising, in combination:

simulator control means operable by a human subject in the simulator for generating flight command signals corresponding to those in a simulated aircraft;

first computer means for translating said command signals to simulated aircraft motion signals indicative of the commanded linear acceleration and angular motion of the simulated aircraft;

function generator means responsive to the longitudinal acceleration component of the simulated aircraft linear acceleration motion signals for generating a variable bias signal which maintains the actual longitudinal acceleration of the simulator above a preselected level;

second computer means responsive to the motion signals of the simulated aircraft and said bias signal for generating a control signal for driving the simulator in response thereto;

sensor means for generating a simulator signal indicative of the linear acceleration and angular motion actually encountered by the simulator;

third computer means responsive to said motion signals of the simulated aircraft for generating signals indicative of the perceived roll and pitch angular motions predicted for a pilot in the simulated aircraft;

fourth computer means responsive to the simulator signal for generating signals indicative of the perceived roll and pitch angular motions predicted for the subject in the simulator;

first comparator means responsive to the perceived simulator and simulated aircraft roll signals for producing an output signal indicative of the difference therebetween; and second comparator means responsive to the perceived simulator and aircraft pitch signals for producing an output signal indicative of the difference therebetween.

2. A control system according to claim 1 wherein:
said first computer means translates said command signals according to equations of motion of the simulated aircraft.

3. A control system according to claim 1 wherein:
said second computer means generates said control signal according to modified force equations of the simulator.

4. A control system according to claim 1 wherein:
said third computer means generates said perceived roll and pitch signals according to the combined perceived roll and pitch angular displacements of the simulated aircraft and perceived roll and pitch angular displacements of the acceleration vector of the simulated aircraft; and said fourth computer means generates said perceived roll and pitch signals according to the combined perceived roll and pitch angular displacements of the simulator and the perceived roll and pitch angular displacements of the acceleration vector of the simulator.

5. A control system according to claim 1 wherein:
said first and second comparators compare the perceived pitch and roll values, respectively, of the aircraft and simulator subjects by integrating over a period of time the absolute values of their differences.

6. A control system according to claim 5 wherein:
said first and second comparators weigh the relative influence of angular motion and linear acceleration according to a preference of the subject.

7. A control system according to claim 1 wherein the preselected level of the actual longitudinal acceleration is 1.05G.

8. A dynamic flight simulation system comprising, in combination:
   a simulator means articulated to simulate the linear acceleration and angular motions of an aircraft;
   first means for generating simulator control signals indicative of the linear acceleration and angular motion of a simulated aircraft for driving the simulator means in response thereto;
   second means for generating a simulator output signal indicative of the actual linear acceleration and angular motion signals of the simulator;
   third means responsive to the simulated aircraft signals and simulator signals from said first and second means for generating signals indicative of the perceived angular motion predicted for a pilot in the simulated aircraft and a subject in said simulator; and
   fourth means for comparing the actual angular motion signals from said second means and the perceived angular motion signals from said third means to derive the differences therebetween and for minimizing such differences to optimize the angular motion realism of said flight simulation system.

* * * * *